May 4, 1943.  L. W. BRUSSE  2,318,053
WALL JOINT CONSTRUCTION
Filed June 14, 1940

LESTER W. BRUSSE
INVENTOR.

BY Jesse R. Stone
Lester B. Clark
ATTORNEYS

Patented May 4, 1943

2,318,053

UNITED STATES PATENT OFFICE 2,318,053

WALL JOINT CONSTRUCTION

Lester W. Brusse, Houston, Tex.

Application June 14, 1940, Serial No. 340,417

6 Claims. (Cl. 72—16)

This invention relates to the formation of a smooth joint between adjacent panels secured to support members whereby a smooth surface of extended area is produced from smaller panel sections.

It has been proposed to produce structures having plane surfaces to serve as walls, ceilings, etc., such surfaces comprising a plurality of panels secured to underlying supporting members having their supporting surfaces lying in a common plane or in a plurality of planes forming the corners between adjacent surfaces. Difficulties have been experienced in such structures in obtaining a smooth surface over the joints and one which will remain smooth over a long period of time amid changing conditions of temperature, humidity and movements occasioned in the supporting structure.

The primary object of the invention is to provide a smooth and lasting joint construction between adjacent members secured to underlying supports.

It is also an object to provide a surface having a pleasing appearance or one which may be finished by paint, papering, etc.

Another object is to provide a construction with a minimum of material and labor and one which may be produced effectively by relatively unskilled labor.

Still another object is to provide a joint construction which resists deformation and hence provides a smooth surface at all times and under changing conditions.

A more specific object is to provide a joint construction by overlying a joint between adjacent members with a thin joint strip which is secured in place by forcibly displacing portions of the strip into the members.

Another object is to provide a joint construction between adjacent members and including a joint strip overlying the joint between the members such strip being imperforate directly over the juxtaposed edges of the members.

It is also an object to secure the displaced portions of the strip in place within the members and to provide a continuous smooth surface over the strip by applying a plastic material to fill the depressions in the strip and members.

The foregoing objects together with others will be apparent from the following description taken in connection with the accompanying drawing in which.

Figure 1:
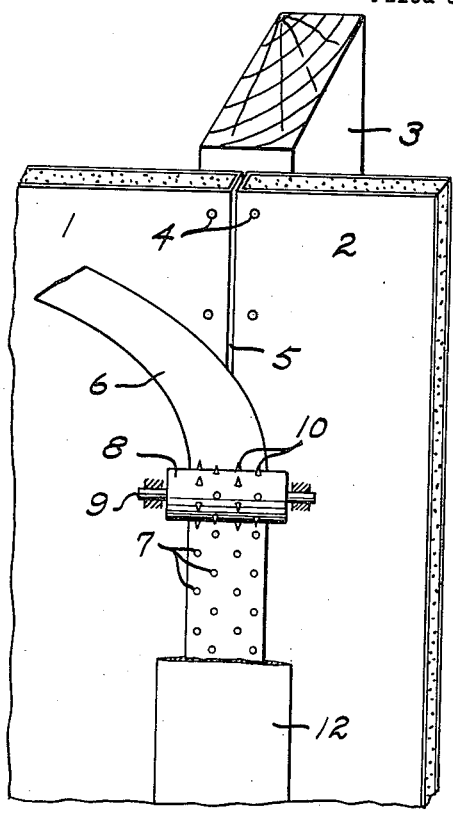
Fig. 1 is a perspective view partly in section illustrating a construction as produced in accordance with the invention.

In the drawing the panels or wall boards 1 and 2, which may be of any of the various available types of wall boards, are attached to the support member 3 such as a stud or joist by means of nails 4 or other suitable fasteners. The edges of the panels may be slightly spaced as illustrated or may be closely abutted, as desired, to form the joint 5 which is to be finished in such a manner as to provide a permanent smooth surface continuous with the surfaces of the panels 1 and 2.

To produce such a finished joint in accordance with the present invention there is provided a joint strip 6 which is of a width to overlie a limited area of the panels 1 and 2 adjacent the edges thereof. This joint strip 6 may be of any suitable material such as paper or other fibrous material but is preferably a strip of metal foil. If a metal foil is used it may desirably be of corrosion resistant material such as any of the well known stainless steels or non ferrous alloys having desired strength and other properties which aid in the production of a satisfactory joint.

The joint strip 6 is placed over the joint 5 and is pierced at a plurality of spacing points 7 as by a roller 8 mounted upon a shaft 9 and provided with suitable means such as a handle (not shown) so that pressure may be applied as the roller is made to traverse the strip throughout its length. The roller 8 carries a plurality of projections 10 which pierce the joint strip and together with the tangs 11 of displaced strip material enter the surface of the panels 1 and 2 thus forming depressions therein. The tangs 11 engage the walls of the depressions frictionally and are also of such configuration as to tend to remain embedded within the panels. In this manner the joint strip 6 is secured in position over the joint 5.

The bonding of the joint strip 6 to the panels 1 and 2 is enhanced by the application of the joint or plastic cement 12 which is forced into the depressions in the panels and the openings in the joint strip 6 as well as along the edges of the strip. In this manner there is formed a smooth joint to which paint, paper or any other suitable surfacing material may be applied.

Figure 3:
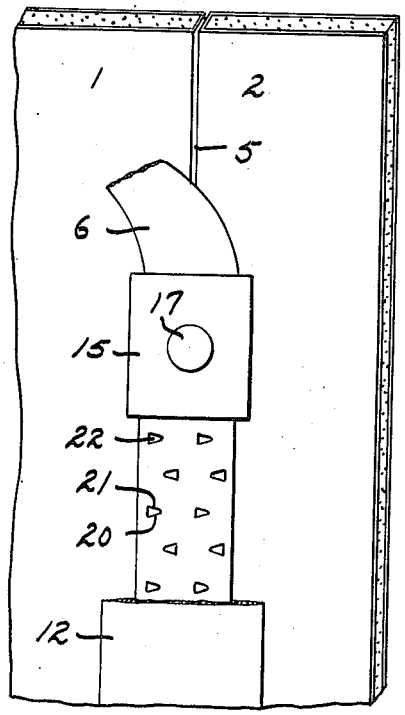
Fig. 3 is a perspective view illustrating a modification in the technique in securing the joint strip in place.
Figure 2:
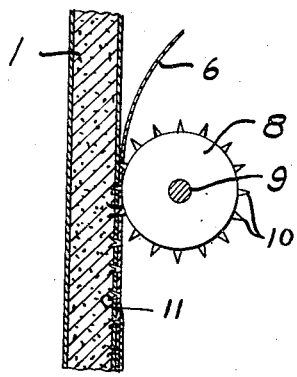
Fig. 2 is a sectional view taken adjacent the joint in Fig. 1 at a right angle thereto.
Figures 4, 5:
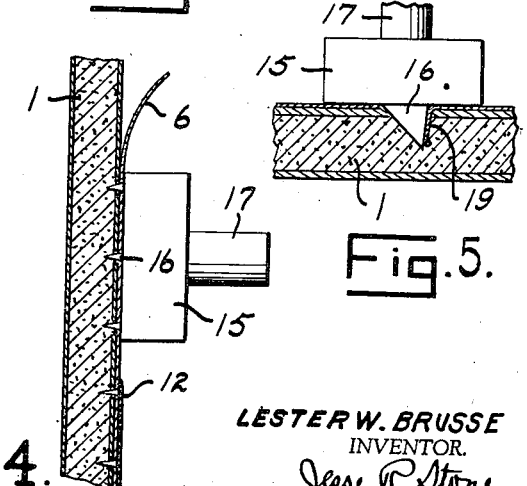
Fig. 4 is a sectional view taken adjacent the joint in Fig. 3 and at right angles thereto.
Fig. 5 is an enlarged sectional view showing the manner of displacing material of the joint strip into one of the members forming the joint.

Various methods of desirably piercing the joint strips 6 and displacing tangs of the material of the strip into the panels 1 and 2 will be apparent to those skilled in the art. One of such alternative modes is shown in Figs. 3 to 5 wherein the piercing is effected by means of a block 15 bearing projections 16 and having an extension 17 to which force may be applied by impact to affect the desired piercing. The projections 16 may be of various configurations but are illustratively shown in Fig. 5 as generally triangular and tapering toward one apex so that joint strip 6 is severed by each projection along two intersecting lines 20 and 21, the intervening metal being placed downwardly into the respective panels 1 and 2 and forming indentations 22. In this manner the tangs 19 of this embodiment are forced into position within the depressions 22 in the panels.

In forming a joint in the manner just described conditions are such that moisture is readily liberated from the plastic cement 12 thus expediting the completion of the joint so that succeeding operations may follow with a minimum of delay. At the same time the piercing operation may be so carried out that adequate material of the joint strip 6 remains to provide desired strength along the joint. It seems apparent that, if for any reason it is desired to provide additional points of attachment to the panels at a given location, additional piercing of the strip may be readily effected at that location.

Attention is directed to the fact that, in accordance with the invention as illustratively described above, there are no perforations in the strip over the joint or the juxtaposed edges of the members being joined. Hence the strength of the joint strip is not impaired in this area where strength is most important. Furthermore whether either an interior or exterior corner joint is being formed the angular bend in the joint strip does not pass through any of the perforations in the strip. This feature preserves the strength of the joint strip and also provides a floating joint or one which permits limited movement of the edges of the members from changes in conditions affecting the joint.

Broadly the invention comprehends a novel method of producing a smooth and permanent joint between adjacent panel members attached to supports.

What is claimed is:

1. The method of forming a concealed joint between adjacent panels secured to a support member in substantially abutting relation comprising the steps of positioning a joint strip upon the surface of the panels in surface-to-surface relationship and over the joint formed by the meeting edges of the panels, and securing said strip in place by piercing the strip at a plurality of points, and forcing the strip material displaced into the panels.

2. The method of forming a concealed joint between adjacent panels secured to a support member and in substantially abutting relation, such method comprising the steps of positioning a joint strip of thin material upon the surface of the panels in surface-to-surface relationship and over the joint formed by the meeting edges of the panels, piercing said strip at a plurality of points, and forcing the strip material displaced into the underlying panels, and applying to said strip a plastic material to fill the depressions formed by the piercing step so that a smooth surface over the joint is formed.

3. In a wall construction the combination of a supporting member having panels attached thereto in substantially abutting relation to form a joint, and a strip of thin metal upon the panels and overlying said joint, said strip being secured to the panels by tangs of metal displaced from the strip and indented into the panels.

4. In a wall construction the combination of a supporting member having panels attached thereto in substantially abutting relation to form a joint, a strip of thin metal upon the panels and overlying said joint, said strip being secured to the panels by tangs of metal displaced from the strip and indented into the panels, and a plastic material filling the openings in the metal strip and the indentations in the panels.

5. In a wall construction the combination of a supporting member having panels attached thereto and forming a joint, a joint strip upon the panels and overlying said joint, such strip being pierced at a plurality of spaced points to form tangs indented into the panels, and a plastic material filling such indentations whereby a smooth surface is provided over the concealed joint.

6. In a wall construction the combination of a supporting member having panels attached thereto and forming a joint, and a joint strip upon the panels and overlying said joint, said strip being pierced at a plurality of spaced points to form tangs indented into the panels to secure the strip thereto, the openings in the strip being located in a manner to provide an unbroken area of the strip directly over the joint formed by the juxtaposed edges of the panels.

LESTER W. BRUSSE.